United States Patent
Jackson et al.

(10) Patent No.: US 7,722,729 B2
(45) Date of Patent: May 25, 2010

(54) METHOD FOR REPAIRING HIGH TEMPERATURE ARTICLES

(75) Inventors: Melvin Robert Jackson, Corea, ME (US); Liang Jiang, Schenectady, NY (US); Ji-Cheng Zhao, Latham, NY (US); Canan Uslu Hardwicke, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/260,106

(22) Filed: Oct. 29, 2008

(65) Prior Publication Data

US 2009/0053424 A1 Feb. 26, 2009

Related U.S. Application Data

(62) Division of application No. 10/747,712, filed on Dec. 23, 2003, now Pat. No. 7,494,619.

(51) Int. Cl.
*B32B 15/01* (2006.01)
*C22F 1/14* (2006.01)
*C22C 5/04* (2006.01)
*B23K 31/00* (2006.01)

(52) U.S. Cl. .............. 148/516; 148/678; 148/430; 228/119; 420/462

(58) Field of Classification Search ........... 148/516, 148/678, 430; 228/119; 420/462
See application file for complete search history.

(56) References Cited

U.S. PATENT DOCUMENTS

| 1,990,277 | A | 2/1935 | Feussner et al. |
|---|---|---|---|
| 2,370,242 | A | 2/1945 | Hensel et al. |
| 2,636,819 | A | 4/1953 | Streicher |
| 3,622,310 | A | 11/1971 | Reinacher |
| 3,640,705 | A | 2/1972 | Selman et al. |
| 3,773,482 | A | 11/1973 | Hansen et al. |
| 4,305,998 | A | 12/1981 | Manty et al. |
| 4,399,199 | A | 8/1983 | McGill et al. |
| 6,129,997 | A | 10/2000 | Braun et al. |
| 6,554,920 | B1 * | 4/2003 | Jackson et al. .............. 148/442 |
| 6,582,534 | B2 | 6/2003 | Jackson et al. |
| 6,623,692 | B2 | 9/2003 | Jackson et al. |
| 6,663,728 | B2 | 12/2003 | Manhardt et al. |
| 6,838,190 | B2 | 1/2005 | Lee et al. |
| 2003/0049156 | A1 | 3/2003 | Jackson et al. |
| 2003/0079810 | A1 | 5/2003 | Jackson et al. |
| 2003/0118448 | A1 | 6/2003 | Lee et al. |

FOREIGN PATENT DOCUMENTS

| EP | 0732416 B1 | 9/1996 |
|---|---|---|
| WO | WO03/081702 A2 | 10/2003 |

OTHER PUBLICATIONS

H.Y. Geng et al., "First-principles equation of state and phase stability for the Ni-Al system under high pressures", Phys. Rev. B 70, 094203, pp. 1-10 (2004).

XP-002325610, O. Kurtz, "The Growth of Rhodium on a Graphite and a Rhenium Surface", Universitat Berlin, Fachbereich Biologie, Berlin, pp. 138 and 184, 1999.

XP-002325611, W. Wegscheider, "Skriptum: Chemie/Chem. Technol.", Institute Fur Eleektrocheme, Montanuniversitat Leoben, Leoben, p. 43, 1996.

\* cited by examiner

*Primary Examiner*—Roy King
*Assistant Examiner*—Jessee R. Roe
(74) *Attorney, Agent, or Firm*—Paul J. DiConza

(57) ABSTRACT

A method for repairing an article comprises providing an article, providing a repair material, and joining said repair material to said article. The repair material comprises, in atom percent, at least about 50% rhodium; up to about 49% of a first material, said first material comprising at least one of palladium, platinum, iridium, and combinations thereof; from about 1% to about 15% of a second material, said second material comprising at least one of tungsten, rhenium, and combinations thereof; and up to about 10% of a third material, said third material comprising at least one of ruthenium, chromium, and combinations thereof. The repair material comprises an A1-structured phase at temperatures greater than about 1000° C., in an amount of at least about 90% by volume.

8 Claims, No Drawings

METHOD FOR REPAIRING HIGH TEMPERATURE ARTICLES

CROSS-REFERENCE TO RELATED APPLICATION

This application is a divisional application of U.S. patent application Ser. No. 10/747,712 filed on Dec. 23, 2003, which is hereby incorporated by reference in its entirety.

BACKGROUND OF THE INVENTION

The present invention relates to materials designed to withstand high temperatures. More particularly, this invention relates to heat-resistant alloys for high-temperature applications, such as, for instance, gas turbine engine components of aircraft engines and power generation equipment. The present invention further relates to methods for repairing articles for high temperature applications.

There is a continuing demand in many industries, notably in the aircraft engine and power generation industries where efficiency directly relates to equipment operating temperature, for alloys that exhibit sufficient levels of strength and oxidation resistance at increasingly higher temperatures. Gas turbine airfoils on such components as vanes and blades are usually made of materials known in the art as "superalloys." The term "superalloy" is usually intended to embrace iron-, cobalt-, or nickel-based alloys, which include one or more additional elements to enhance high temperature performance, including such non-limiting examples as aluminum, tungsten, molybdenum, titanium, and iron. The term "based" as used in, for example, "nickel-based superalloy" is widely accepted in the art to mean that the element upon which the alloy is "based" is the single largest elemental component by atom fraction in the alloy composition. Generally recognized to have service capabilities limited to a temperature of about 1200° C., conventional superalloys used in gas turbine airfoils often operate at the upper limits of their practical service temperature range. In typical jet engines, for example, bulk average airfoil temperatures range from about 900° C. to about 1100° C., while airfoil leading and trailing edge and tip temperatures can reach about 1150° C. or more. At such elevated temperatures, the oxidation process consumes conventional superalloy parts, forming a weak, brittle metal oxide that is prone to chip or spall away from the part.

Erosion and oxidation of material at the edges of airfoils lead to degradation of turbine efficiency. As airfoils are worn away, gaps between components become excessively wide, allowing gas to leak through the turbine stages without the flow of the gas being converted into mechanical energy. When efficiency drops below specified levels, the turbine must be removed from service for overhaul and refurbishment. A significant portion of this refurbishment process is directed at the repair of the airfoil leading and trailing edges and tips. For example, damaged material is removed and then new material built onto the blade by any of several methods, such as, for example, welding with filler material, welding or brazing new sections onto the existing blade, or by plasma spraying or laser deposition of metal powders onto the blade. The performance of alloys commonly used for repair is comparable or inferior to that of the material of the original component, depending upon the microstructure of the repaired material, its defect density due to processing, and its chemistry. Furthermore, in current practice, the original edge material is made of the same material as the rest of the original blade, often a superalloy based on nickel or cobalt. Because this material was selected to balance the design requirements of the entire blade, it is generally not optimized to meet the special local requirements demanded by conditions at the airfoil leading or trailing edges. However, maximum temperatures, such as those present at airfoil tips and edges, are expected in future applications to be over about 1300° C., at which point many conventional superalloys begin to melt. Clearly, new materials for repair and manufacture must be developed to improve the performance of repaired components and to exploit efficiency enhancements available to new components designed to operate at higher turbine operating temperatures.

BRIEF DESCRIPTION

Embodiments of the present invention address these and other needs. One embodiment is an alloy comprising, in atom percent, at least about 50% rhodium, up to about 49% of a first material, from about 1% to about 15% of a second material, and up to about 10% of a third material. The first material comprises at least one of palladium, platinum, iridium, and combinations thereof. The second material comprises at least one of tungsten, rhenium, and combinations thereof. The third material comprises at least one of ruthenium, chromium, and combinations thereof. The alloy comprises an A1-structured phase at temperatures greater than about 1000° C., in an amount of at least about 90% by volume.

Another embodiment is an article for use in a high temperature, oxidative environment. The article comprises the alloy described above.

A further embodiment is a method for making an article. The method comprises providing the alloy described above.

Another embodiment is a method for repairing an article. The method comprises providing an article, providing a repair material that comprises the alloy described above, and joining the repair material to the article.

DETAILED DESCRIPTION

The description herein employs examples taken from the gas turbine industry, particularly the portions of the gas turbine industry concerned with the design, manufacture, operation, and repair of aircraft engines and power generation turbines. However, the scope of the invention is not limited to only these specific industries, as the embodiments of the present invention are applicable to many and various applications that require materials resistant to high temperature and aggressive environments.

The alloy of the present invention balances a number of competing material requirements, including, for example, strength, ductility, and oxidation resistance. The composition ranges developed for this alloy have been selected based on the need to achieve sufficient strength to withstand the stresses associated with many industrial machine components, while maintaining sufficient ductility to allow the material to be formed into complex shapes. All of this must be done while preserving very high resistance to oxidation.

In accordance with one embodiment of the present invention, the alloy comprises, in atom percent, at least about 50% rhodium and up to about 49% of a first material, where the first material comprises at least one of palladium, platinum, iridium, and combinations thereof. These platinum-group metals are all highly resistant to most forms of environmental attack and provide the alloy of the present invention with extraordinary oxidation resistance at high temperatures. The elements comprising the first material have A1 crystal structures, as does rhodium, and at temperatures above about 1000° C. each of these elements dissolves in rhodium to form a single-phase solid solution having this same crystal structure. This A1-structured phase provides a desirable combination of properties. Having a high amount of A1-structured elements in the alloy promotes the formation and stability of the desirable single-phase microstructure. Accordingly, in certain embodiments, a sum of the atom percentage of rhodium in the alloy plus the atom percentage of the first material in the alloy is at least about 75 atom percent, and in particular embodiments this sum is at least about 85 atom percent. In all cases, the alloy of the present invention comprises, at temperatures greater than about 1000° C., at least about 90% by volume of the A1-structured phase.

The strength of the alloy is enhanced by additions of other materials. The alloy further comprises from about 1% to about 15% of a second material comprising at least one of tungsten, rhenium, and combinations thereof. Moreover, the alloy comprises up to about 10% of a third material comprising at least one of ruthenium, chromium, and combinations thereof. These additions serve to strengthen the alloy via a solid solution strengthening mechanism, but the amounts added to the alloy are limited by concerns about maintaining oxidation resistance and ductility. The amounts of second and third materials added to the alloy are broadly governed by the respective solubilities of the constituent elements in the A1-structured phase, to avoid precipitation of deleterious amounts of secondary phases. Moreover, the allowed amounts are further restricted in certain embodiments where oxidation resistance is a key concern. For example, in particular embodiments the second material is present in an amount from about 1 atom percent to about 6 atom percent; and the third material is present in an amount up to about 8 atom percent. In these embodiments, the composition of the third material is controlled within the above constraint such that ruthenium is present in an amount up to about 4 atom percent and chromium is present in an amount up to about 6 atom percent.

In certain embodiments, a fourth material is added to the alloy to provide even further strengthening. The fourth material comprises at least one element that not only provides a certain degree of solid solution strengthening when the element itself is dissolved in the A1-structured phase, but also forms a highly stable oxide. Such elements include zirconium, yttrium, hafnium, tantalum, aluminum, titanium, scandium, elements of the lanthanide series, and elements of the actinide series. The alloy, in these embodiments, comprises up to about 3 atom percent of the fourth material, and in certain embodiments, the fourth material is present in an amount from about 0.1 atom % to about 2 atom %. In some embodiments, the fourth material is present in the alloy in the form of a plurality of oxide particles dispersed throughout the alloy, wherein the oxide particles comprise an oxide of the fourth material. The dispersion of fine oxide particles provides a precipitation strengthening effect to the alloy. Typically, the oxide particles used to effect strengthening in metallic materials have a particle size in the range from about 0.1 micrometer to about 10 micrometers. This dispersion may be formed in situ by adding the fourth material in metallic form to the alloy and then exposing the alloy to a heat treatment in an oxidizing environment, a process that is widely known in the art and an example of which is described in U.S. Pat. No. 3,640,705 to Selman et al. Alternatively, at least a portion of the fourth material in oxide form may be directly added to the alloy and mechanically dispersed, in the manner common in the art of mechanically alloyed materials. In either case, at least a portion of the fourth material, in some embodiments, is present as a solute dissolved in said A1 structured phase.

In order to take full advantage of the compositional effects described above, embodiments of the present invention further include an alloy comprising, in atom percent, at least about 50% rhodium, and up to about 49% of a first material, the first material comprising at least one of palladium, platinum, iridium, and combinations thereof. A sum of the amount of rhodium in the alloy plus the amount of the first material in the alloy is at least about 85 atom percent. The alloy further comprises from about 1% to about 6% of a second material, the second material comprising at least one of tungsten, rhenium, and combinations thereof; and up to about 8% of a third material, the third material comprising at least one of ruthenium, chromium, and combinations thereof. The ruthenium is present in an amount up to about 4 atom percent and the chromium is present in an amount up to about 6 atom percent. Furthermore, the alloy comprises up to about 2% of a fourth material, the fourth material comprising at least one of zirconium, yttrium, hafnium, tantalum, aluminum, titanium, scandium, elements of the lanthanide series, elements of the actinide series, and combinations of any of the foregoing. The alloy comprises an A1-structured phase at temperatures greater than about 1000° C., in an amount of at least about 90% by volume.

Alloys set forth herein as embodiments of the present invention are suitable for production using any of the various known methods of metal production and forming. Conventional casting, powder metallurgical processing, directional solidification, and single-crystal solidification are non-limiting examples of methods suitable for forming ingots of these alloys. Thermal and thermo-mechanical processing techniques common in the art for the formation of other alloys, including, for instance, forging and heat treating, are suitable for use in manufacturing and strengthening the alloys of the present invention.

Another embodiment is an article for use in a high temperature, oxidative environment. The article comprises the alloy described above. The article may be one that has been repaired, or it may be a newly manufactured article. In some embodiments, the article comprises a component of a gas turbine engine, such as, for example, a turbine blade, vane, or a combustor component. Up to the entire component may comprise the alloy of the present invention. Furthermore, the alloy of the present invention may be suitably disposed anywhere on the component, including, in certain embodiments, at one or more regions of the component that are particularly prone to experience high local temperatures, such as, for example, leading and trailing edges of blades and vanes, and blade tips. In certain embodiments, the article comprises a coating disposed on a substrate, and the coating comprises the alloy. Suitable methods for disposing the coating include, for example, thermal spraying, plasma spraying, HVOF spraying, and laser deposition. Having only particular sections (i.e., those sections known to experience the most aggressive stress-temperature combinations) of the airfoil comprise the alloy of the present invention minimizes certain drawbacks of alloys comprising significant amounts of platinum group metals such as, for example, platinum, rhodium, and palladium, including their high cost and high density in comparison to conventional airfoil materials. These drawbacks have a reduced effect on the overall component because the comparatively expensive and dense alloy (relative to conventional superalloys) comprises only a fraction of the overall surface area of the component. The properties of the component are thus "tailored" to the expected localized environments, reducing the need for compromise during the design process and increasing the expected operating lifetimes for new and repaired components.

Further embodiments of the present invention include methods for making the article described above, and methods for repairing such an article. The method for making the article comprises providing the alloy described above. In the method for repairing an article, an article is provided. The article, in certain embodiments, comprises a component of a gas turbine engine, including, for example, a blade, a vane, or a combustion component. A repair material is provided, and this repair material comprises the alloy described herein. This repair material is joined to the article. In some embodiments, joining is accomplished, at least in part, by disposing a coating comprising the repair material onto the article being repaired. In other embodiments, the repair material is joined to the substrate by one or more conventional joining processes, including, for example, welding, brazing, or diffusion bonding. Regardless of whether the repair material is in the form of a coating or a solid section, it may be disposed at any section of the article deemed to require the performance characteristics of the repair material. These sections include, for example, the leading and trailing edges of airfoils, and blade tips.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A method for repairing an article, said method comprising:
   providing an article;
   providing a repair material, said repair material consisting of, in atomic percent:
      at least about 50 atomic percent rhodium;
      up to about 49 atomic percent of a first material, said first material consisting of at least one of palladium, platinum, iridium, and combinations thereof;
      from about 1 to about 15 atomic percent of a second material, said second material consisting of at least one of tungsten, rhenium, and combinations thereof; and
      up to about 10 atomic percent of a third material, said third material consisting of at least one of ruthenium, chromium, and combinations thereof;
      from about 0.1 to about 2 atomic percent of a fourth material, said fourth material consisting of at least one of zirconium, yttrium, hafnium, tantalum, aluminum, titanium, scandium, elements of the lanthanide series, elements of the actinide series, and combinations thereof;
      wherein said repair material has an A1-structured phase at temperatures greater than about 1000° C., in an amount of at least about 90% by volume; and
   joining said repair material to said article.

2. The method of claim 1, wherein a sum of the amount of rhodium in the repair material plus the amount of said first material in the repair material is at least about 75 atomic percent.

3. The method of claim 1, wherein joining comprises at least one of welding, brazing, and diffusion bonding.

4. The method of claim 1, wherein joining comprises disposing a coating onto said article, said coating comprising said repair material.

5. The method of claim 4, wherein disposing said coating comprises disposing said coating by at least one process selected from the group consisting of thermal spraying, plasma spraying, HVOF spraying, and laser deposition.

6. The method of claim 1, wherein said article comprises a component of a gas turbine engine selected from the group consisting of a blade, a vane, and a combustion component.

7. The method of claim 6, wherein joining comprises disposing said repair material on at least one component section selected from the group consisting of a leading edge, a trailing edge, and a blade tip.

8. A method for repairing a gas turbine engine component, said method comprising:
   providing at least one gas turbine engine component selected from the group consisting of a blade, a vane, and a combustion component;
   providing a repair material, said repair material consisting of, in atomic percent:
      at least about 50 atomic percent rhodium;
      up to about 49 atomic percent of a first material, said first material consisting of at least one of palladium, platinum, iridium, and combinations thereof;
      from about 1 to about 6 atomic percent of a second material, said second material consisting of at least one of tungsten, rhenium, and combinations thereof; and
      up to about 8 atomic percent of a third material, said third material consisting of at least one of ruthenium, chromium, and combinations thereof, wherein said ruthenium is present in an amount up to about 4 atom percent and said chromium is present in an amount up to about 6 atom percent; and
      from about 0.1 to about 2 atomic percent of a fourth material, said fourth material consisting of at least one of zirconium, yttrium, hafnium, tantalum, aluminum, titanium, scandium, elements of the lanthanide series, elements of the actinide series, and combinations of any of the foregoing;
   wherein said repair material has an A1-structured phase at temperatures greater than about 1000° C., in an amount of at least about 90% by volume, and wherein a sum of the amount of rhodium in said repair material plus the amount of said first material in said repair material is at least about 85 atom percent; and
   joining said repair material to said component by disposing said repair material at least one component section selected from the group consisting of a leading edge, a trailing edge, and a blade tip.

* * * * *

UNITED STATES PATENT AND TRADEMARK OFFICE
CERTIFICATE OF CORRECTION

PATENT NO. : 7,722,729 B2
APPLICATION NO. : 12/260106
DATED : May 25, 2010
INVENTOR(S) : Jackson et al.

Page 1 of 1

It is certified that error appears in the above-identified patent and that said Letters Patent is hereby corrected as shown below:

In Column 1, Line 8, after "2003,", insert -- now U.S. Pat. No. 7,494,619 --.

Signed and Sealed this

Seventeenth Day of August, 2010

David J. Kappos
*Director of the United States Patent and Trademark Office*